United States Patent
Muhs et al.

(10) Patent No.: US 7,367,832 B2
(45) Date of Patent: May 6, 2008

(54) ADAPTER FOR ATTACHING AN INSERTION DEVICE TO A CABLE FITTING

(75) Inventors: Andreas Muhs, Borgentreich (DE); Claudia Hanning, Detmold (DE); Juergen Ziemke, Detmold (DE); Michael Hoeing, Lemgo (DE); Michael Schnatwinkel, Herford (DE); Michaela Muecke, Detmold (DE); Simon Seereiner, Bielefeld (DE); Ulrich Luetkemeier, Detmold (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 0 days.

(21) Appl. No.: 11/593,417

(22) Filed: Nov. 6, 2006

(65) Prior Publication Data

US 2007/0105432 A1   May 10, 2007

(30) Foreign Application Priority Data

Nov. 9, 2005   (DE) .................. 20 2005 017 471 U
Apr. 22, 2006   (DE) .................. 20 2006 006 606 U
Aug. 3, 2006   (DE) .................. 20 2006 011 910 U

(51) Int. Cl.
*H01R 13/213*   (2006.01)
(52) U.S. Cl. ..................................... 439/318
(58) Field of Classification Search ............... 439/318, 439/320, 321, 277; 174/653, 142; 385/86, 385/78, 100, 58
See application file for complete search history.

(56) References Cited

U.S. PATENT DOCUMENTS

| | | | |
|---|---|---|---|
| 4,349,236 A | 9/1982 | Guelden | |
| 5,212,752 A * | 5/1993 | Stephenson et al. | 385/78 |
| 5,710,851 A * | 1/1998 | Walter et al. | 385/86 |
| 6,179,481 B1 * | 1/2001 | Sung | 385/78 |
| 6,364,538 B1 * | 4/2002 | Ishiharada et al. | 385/78 |
| 6,475,009 B2 | 11/2002 | Below | |
| 6,595,791 B2 | 7/2003 | Below | |
| 6,672,774 B2 * | 1/2004 | Theuerkorn et al. | 385/86 |
| 7,189,008 B2 * | 3/2007 | Dye | 385/78 |
| 2006/0263011 A1 * | 11/2006 | Chen et al. | 385/75 |

FOREIGN PATENT DOCUMENTS

DE   102 36 275 B3   1/2004

* cited by examiner

*Primary Examiner*—Alexander Gilman
(74) *Attorney, Agent, or Firm*—Lawrence E. Laubscher, Jr.

(57) ABSTRACT

An adapter assembly for connecting a multi-contact electrical plug within a cable support arrangement includes an elongated adapter body containing a through passage and having a rectangular first end portion containing a chamber for receiving the electrical plug, and a tubular second end portion threadably connected adjacent its free extremity with a concentrically arranged cable sleeve, an annular sealing device being provided for sealing one end of the annular space defined between the cylindrical outer surface of the adapter body tubular end portion and the inner surface of the adjacent end portion of the concentrically arranged sleeve. A second annular seal is supported within the cable sleeve for sealing the entrance of the cable into the adapter through passage, and a third sealing ring is provided for sealing the space between the outer surface of the adapter body rectangular end portion and a slidably mounted outer sleeve member.

23 Claims, 17 Drawing Sheets

ADAPTER FOR ATTACHING AN INSERTION DEVICE TO A CABLE FITTING

CROSS REFERENCE TO RELATED APPLICATIONS

This application is a companion application to the U.S. application Ser. No. 11/641,433 filed Dec. 19, 2006, in the names of Claudia Hanning et al entitled "Adapter Housing for Connecting Insert Devices With a Cable Fitting".

BACKGROUND OF THE INVENTION

1. Field of the Invention

An adapter assembly is provided for connecting a multi-contact electrical plug within a cable support arrangement, including an elongated adapter body containing a cable-receiving through passage and having a rectangular first end portion containing a chamber for receiving an electrical plug connected with the cable, and a tubular second end portion threadably connected at its free end with a concentrically arranged cable sleeve, annular sealing means being provided for sealing one end of the annular space defined between the cylindrical outer surface of the adapter body tubular end portion and the inner surface of the adjacent end portion of the concentrically arranged sleeve.

2. Description of Related Art

As evidenced by the U.S. patent to Guelden (Bell Telephone Laboratories) U.S. Pat. No. 4,349,236 and the German patent of Bernat et al No. DE 102 36 275, various adapter devices have been proposed for supporting electrical plugs relative to cable fittings.

Adapters of this type facilitate the use of the plug arrangements in rough environments—for example, in production facilities or automotive vehicles—by attaining a protective class that is higher when compared to the protective class of the plug part, such as IP65 or IP67. The idea of attaining higher requirements from environmental classifications in the IEC 61067-3-106 Variant 4, in EN 50173-1:2005, in ISO/IEC 24702 and in IEC 61918 was further developed. The afore-mentioned German patent shows a possibility of achieving these standards. This known design, however, presents a problem in that it is suitable only for the transmission of electrical signals and that, as a rule, it is necessary to enlarge the structural space in order to use the solution also for other plug parts, for example, in light conductor techniques (for instance, SC simplex uses, especially at an interval of 7.35 mm). The known design furthermore should be improved with regard to high mechanical and chemical stresses, which it does not meet in an optimum fashion.

The present invention therefore was developed to provide an improved adapter with whose help it is possible by means of simple design features to meet the rigid mechanical and chemical stresses and requirements. Preferably, it should be possible in a simple manner to facilitate the reception of plug parts of varying designs without having to change the adapter. Usefulness would be desired for plugs of data transmission technology with copper and/or light wave conductors, especially for Ethernet and field bus systems; plugs for energy supply technology with copper and/or compressed air lines; and plugs of signal transmission technology with copper conductors, especially for sensors and/or actuators.

SUMMARY OF THE INVENTION

Accordingly, a primary object of the present invention is to provide an adapter assembly including an elongated adapter body containing a cable-receiving through passage and having a rectangular first end portion containing a chamber for receiving an electrical plug connected with the cable, and a tubular second end portion threadably connected at its free end with a concentrically arranged cable sleeve, annular sealing means being provided for sealing one end of the annular space defined between the cylindrical outer surface of the adapter body tubular end portion and the inner surface of the adjacent end portion of the concentrically arranged sleeve.

According to a further object of the invention, a second annular seal is supported within the cable sleeve for sealing the entrance of the cable into the adapter through passage, and a third sealing ring is provided for sealing the space between the outer surface of the adapter body rectangular end portion and a slidably mounted outer sleeve member.

A more specific object of the invention is to provide an adapter assembly of the type described above, wherein the sealing means for sealing the annular space between the adapter body tubular end portion and the concentrically arranged cable sleeve end portion comprises either a separate sectional adapter sleeve component, or is carried directly by the end portion of the outer sleeve member that is slidably mounted on the rectangular end portion of the adapter body.

According to the present invention, the rectangular first end portion of the adapter body contains a chamber for receiving the plug means, and the cylindrical second end portion has external screw threads for the purpose of screwing on a cable sleeve for the cable passage. The cable sleeve has an interior screw threading area extending over a portion of its axial length, and a sleeve end portion that extends axially out over the end of the threading, which cable sleeve end portion has a somewhat larger inside diameter than the outside diameter of the cylindrical end portion of the adapter body, whereby between the inside diameter of the sleeve segment and the outside diameter of the cylindrical segment, there is formed an annular space that is open in the direction of the plug face and that is axially closed off at the other end by the screw threading. The other end of the annular space is closed by an annular seal device that is either integral with an outer member slidably mounted on the adapter body rectangular end portion, or a separate adapter sleeve arranged between the sliding out sleeve and the cable sleeve.

The invention provides a standardized design, especially in the area of the portion that is to be sealed off between the cable sleeve of the cable passage and the sliding outer member; it does so with simple means and in a decisive fashion so that one can achieve a high degree of tolerance and mechanical and chemical resistance. The adapter furthermore can be used for plug parts of the most varied kind without basically having to alter the design to attain a high protective class such as IP65 or IP67.

It is possibly only necessary to use an auxiliary frame or to make parts of the adapter from a certain material. For example, many parts of the adapter can be made either from plastic or metal. The optimum material source will be made according to the requirements profile.

According to another advantageous feature of the invention, at least one plug part is mounted in an auxiliary frame that can be inserted into the plug chamber at the rectangular end of the adapter body. Preferably, the auxiliary frame can also be locked in the receiving housing. The auxiliary frame makes it possible in the simplest way to insert various plug elements in uniformly shaped receiving housings. The need for having various receiving housings ready is thus obviated. It is also conceivable that some plug parts can be attached with the auxiliary frame and that differently shaped plug parts can be inserted directly without an auxiliary frame in the receiving housing and can be locked there.

The adapter arrangement of the present invention is suitable for use with cables having a sheathing diameter of about 5-10 mm, and with plugs such as the RJ45 8xAWG 27/7 piercing contact plug, RJ45 8xAWG26/7-22/7 IDC-contact plug, and LC duplex, 2×SC simplex units at the interval of an SC-RJ:7.35 mm, power contacts, USB, firewall, coax or sensor/actuator contacts.

BRIEF DESCRIPTION OF THE DRAWINGS

Other objects and advantages of the invention will become apparent from a study of the following specification, when viewed in the light of the accompanying drawing, in which.

DETAILED DESCRIPTION OF THE INVENTION

Figure 1:
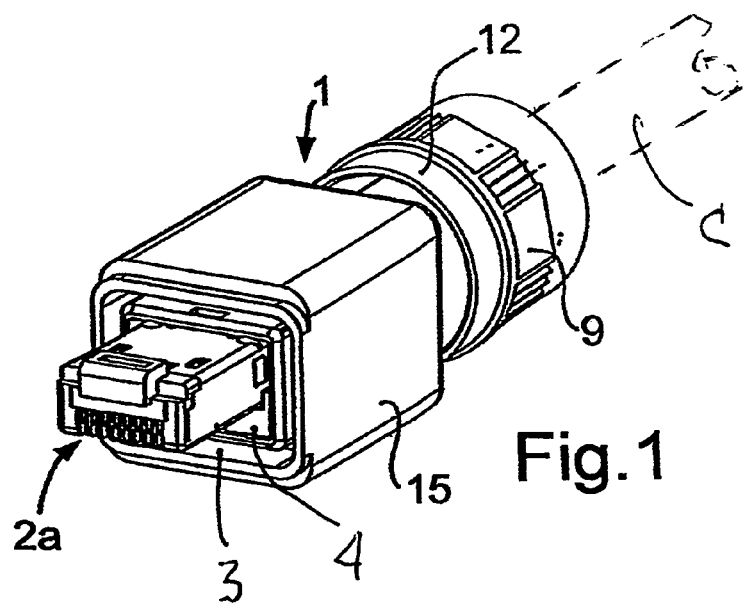
FIG. 1 is a perspective front view of the electrical plug adapter assembly of the present invention including an auxiliary plug support member.
Figure 2:
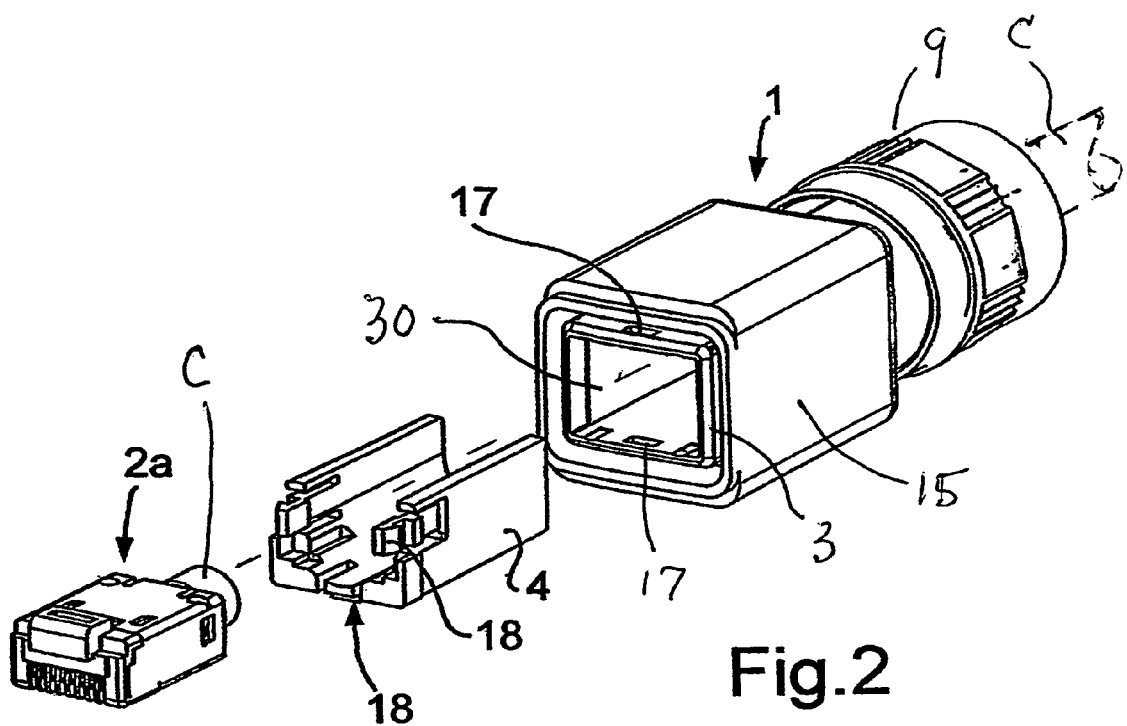
FIG. 2 is an exploded view of the apparatus of FIG. 1.
Figure 11:
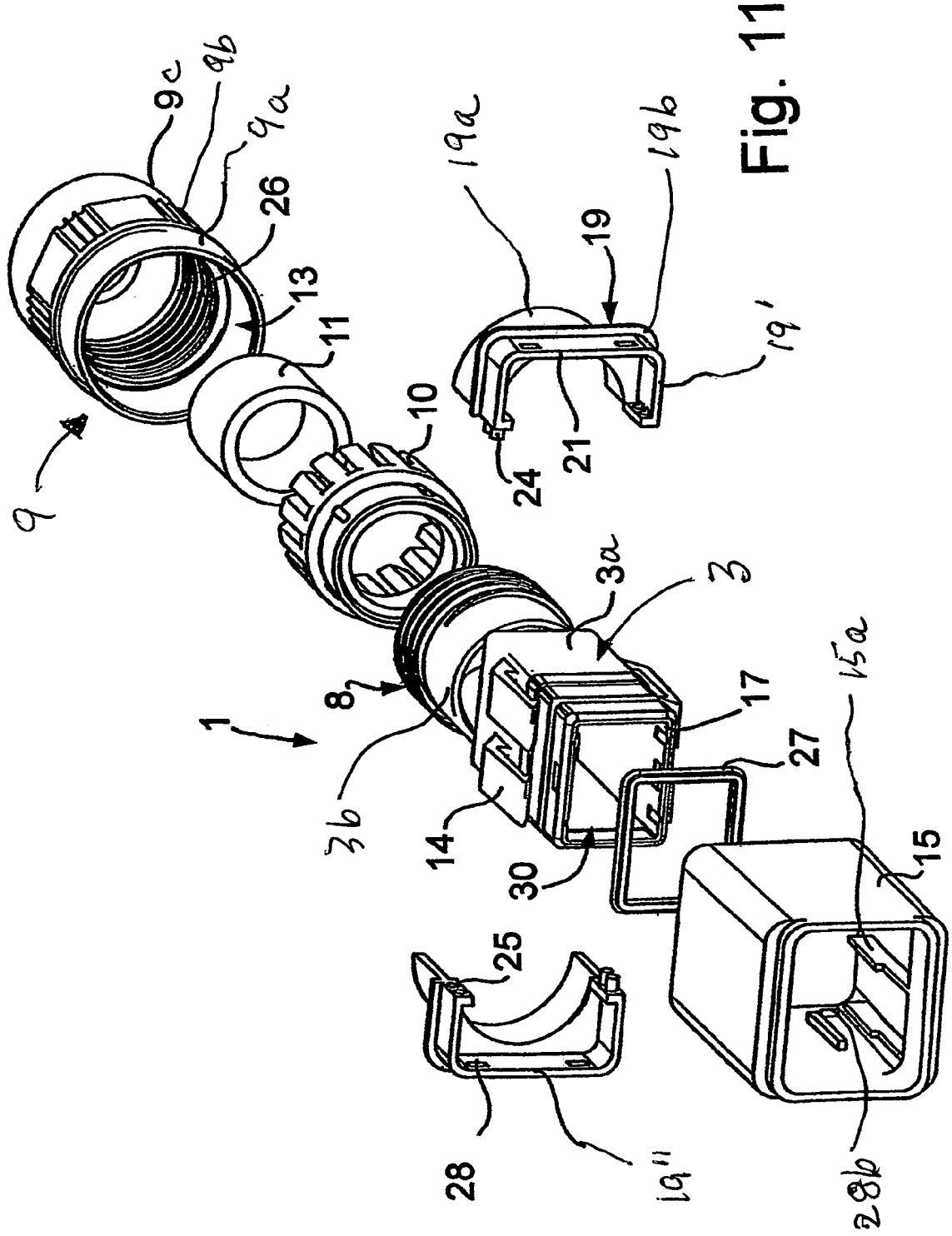
FIG. 11 is a fully exploded perspective view of the preferred embodiment of the adapter assembly of the present invention.
Figure 12:
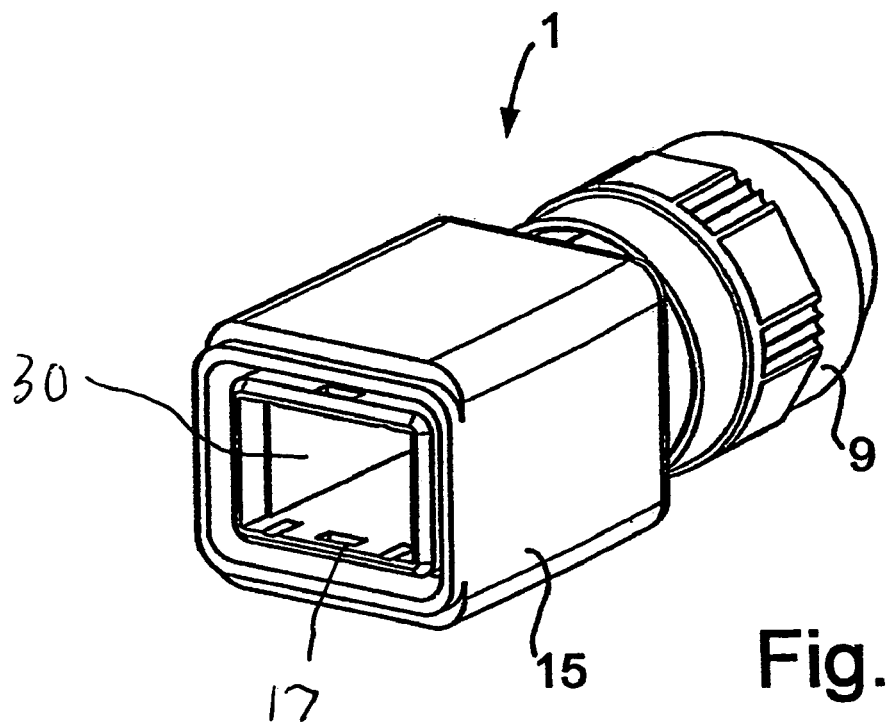
FIGS. 12 and 13 are front perspective and longitudinal sectional views, respectively, of the assembled apparatus of FIG. 11.
Figure 13:
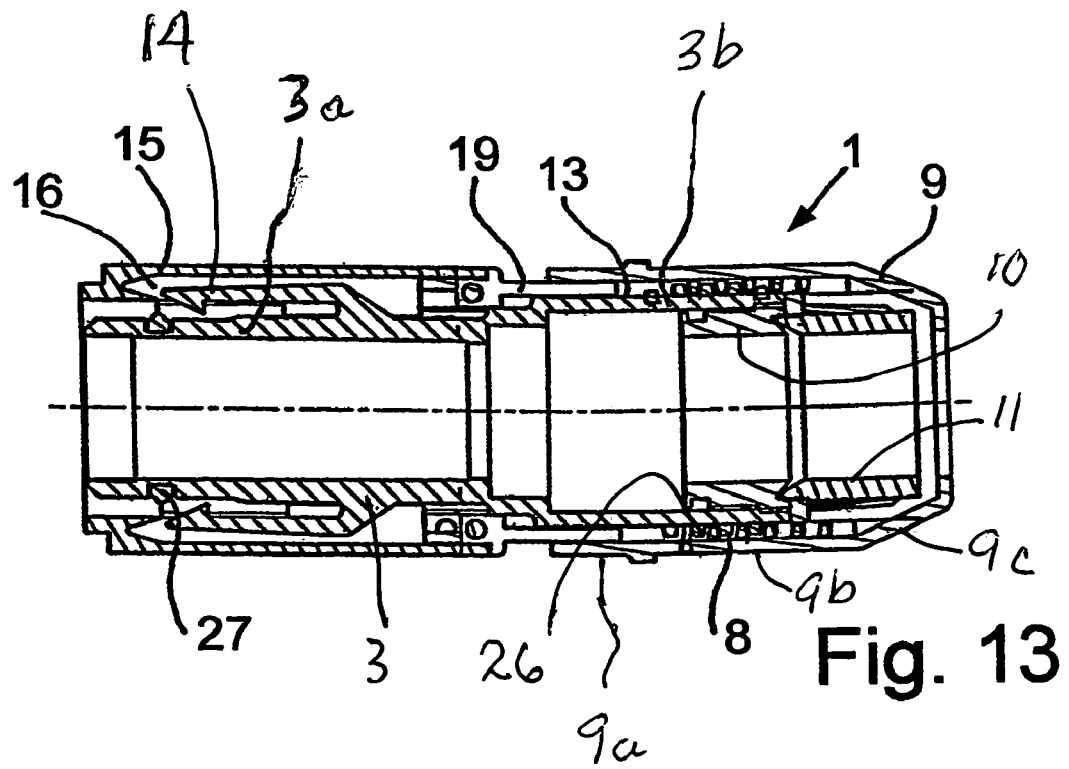

Referring first more particularly to FIGS. 1, 2, and 11, the adapter assembly 1 includes an adapter body 3 having a first rectangular end portion 3a, and a second tubular end portion 3b, as best shown in FIG. 11. The adapter body 3 contains a through passage which defines in the rectangular first end portion 3a a plug-receiving chamber 30 having a generally rectangular cross-sectional configuration, thereby to receive an electrical plug 2a, such as an RJ45 plug, that is connected with the cable C that extends through the adapter body. The cylindrical outer surface of the tubular second end portion 3b of the adapter body is provided with external screw threads 8. Arranged concentrically about the tubular second end portion 3a of the adapter body is a tubular cable sleeve 9 formed of a synthetic plastic material or metal having a tubular first end portion 9a, an internally threaded intermediate portion 9b provided with the screw threads 26, and a second tubular end portion 9c. As shown in FIG. 13, the cable sleeve 9 is mounted concentrically about the tubular end portion 3b of the adapter body 3, with the screw threads 26 on the cable sleeve in threaded engagement with the screw threads 8 at the free end of the tubular end portion 3b of the adapter body 3. As will be explained in greater detail below, the tubular first end portion 9a of the cable sleeve 9 extends in concentrically spaced relation about the outer cylindrical surface of the tubular portion 3b of the adapter body, thereby to define an annular space 13. At one end, the annular space 13 is closed by the threadably engaged screw threads 8 and 26, and the other end of the annular space is closed by the tubular first end portion 19a of an adapter sleeve 19. At its other end, the adapter sleeve 19 includes a rectangular second end portion 19b that extends about the outer circumferential surface of the rectangular first end portion 3a of the adapter body 3. As shown in FIG. 11, this adapter sleeve 19 is longitudinally divided to define a pair of bifurcated sections 19' and 19" that are fastened together by pin and opening snap fastening means 24 and 25.

Arranged concentrically within the tubular end portion 3b of the adapter body 3 is an annular chuck member 10 having a plurality of spring fingers that extend axially about the outer circumferential surface of an annular seal member 11, thereby to support the same within the second end portion 9c of the cable sleeve 9. Thus, when the cable C is inserted within the adapter assembly as shown in phantom in FIG. 13, the seal 11 is in concentric engagement with the outer sheath surface of the cable C.

Slidably mounted on the rectangular end portion 3a of the adapter body 3 is a hollow rectangular outer sleeve member 15. Snap fastener means including projections 14 on the outer surface of the rectangular portion 3a of the adapter body 3 engage corresponding snap recesses 16 (FIG. 13) contained in the adjacent inner surfaces of the outer sleeve member 15, thereby to fasten the sleeve member to the adapter body. A rectangular seal member 27 is mounted between the end surface of the adapter body 3 and a corresponding surface within the outer sleeve member 15.

As shown in FIGS. 1 and 2, in order to mount an electrical plug 2a within the adapter assembly 1, an auxiliary plug support member 4 is provided that is fastened within the rectangular end of the adapter body 3 by releasable locking hooks 18 on the auxiliary plug support that engage corresponding locking opening 17 contained in the rectangular end portion 3a of the adapter body. Similarly, the adapter sleeve 19 is locked within the outer sleeve member 15 by locking means 28 including locking openings 28a provided on the adapter sleeve 19, and locking projections 28b provided on the inner circumferential surface of the outer sleeve member 15.

Figure 3:
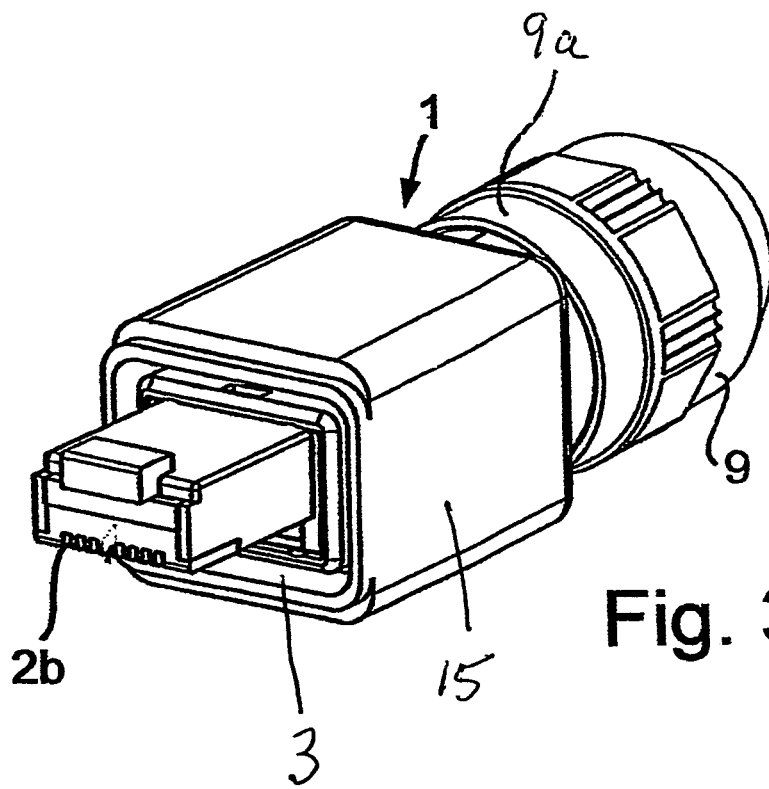
FIGS. 3 and 4 are perspective front and exploded views of the electrical plug adapter assembly of the present invention as used without the auxiliary plug support member of FIGS. 1 and 2, FIGS. 5 and 6 are perspective front and exploded views, respectively, of the plug adapter assembly using a multi-plug type of auxiliary plug support member.
Figure 4:
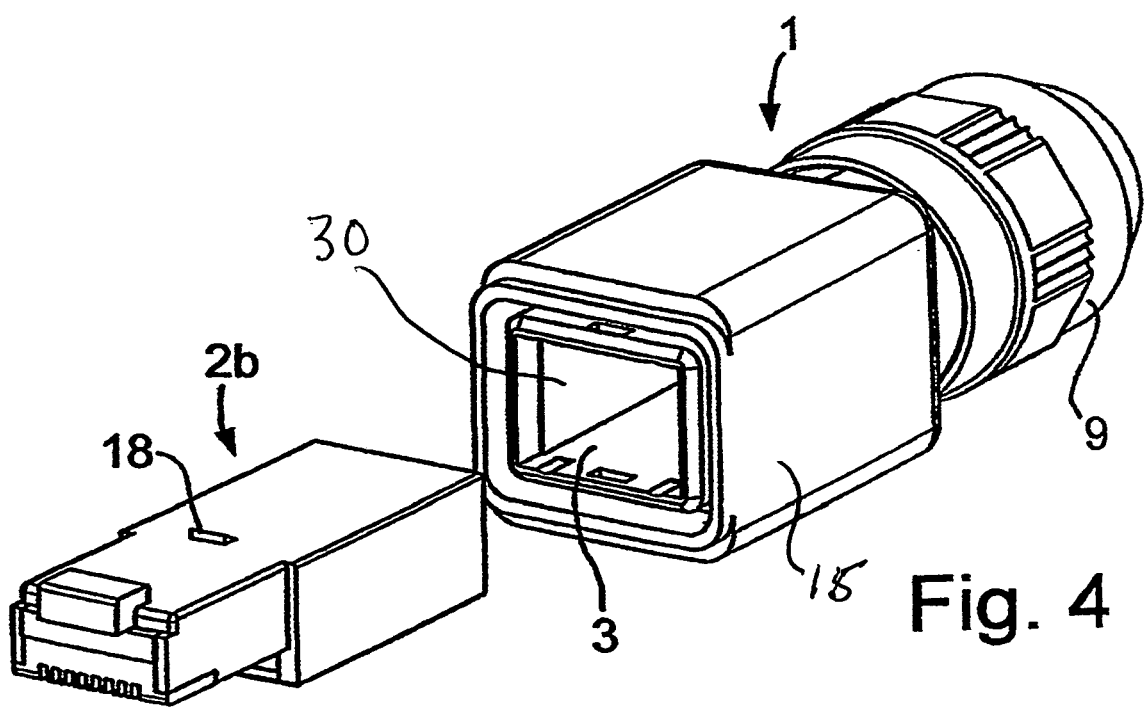
Figure 5:
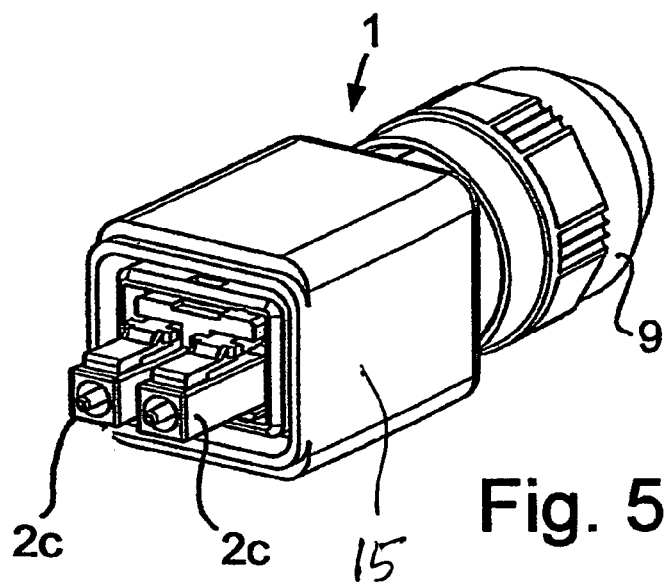
Figure 6:
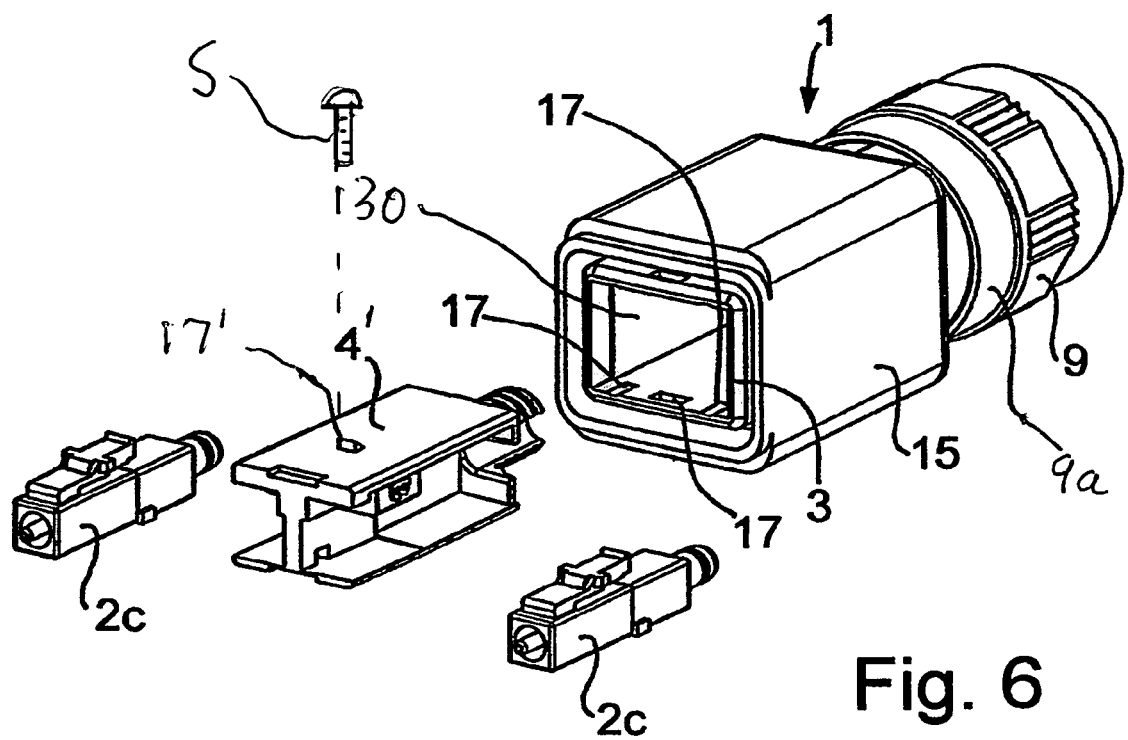
Figure 7:
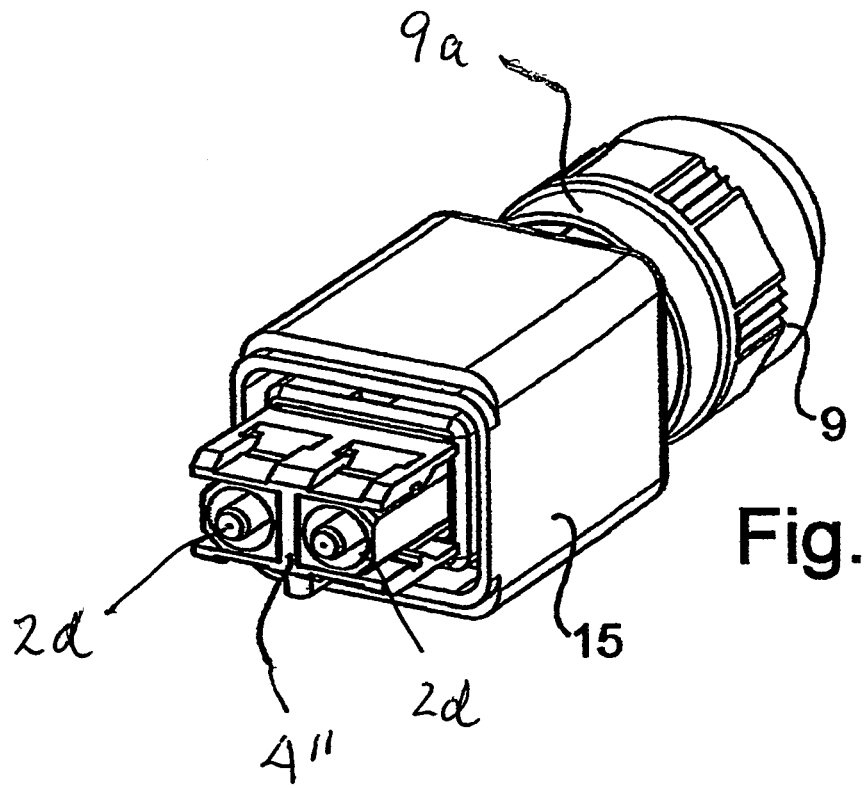
FIGS. 7 and 8 are perspective and exploded views, respectively, of the plug adapter assembly used with a further type of multi-plug auxiliary plug support.
Figure 8:
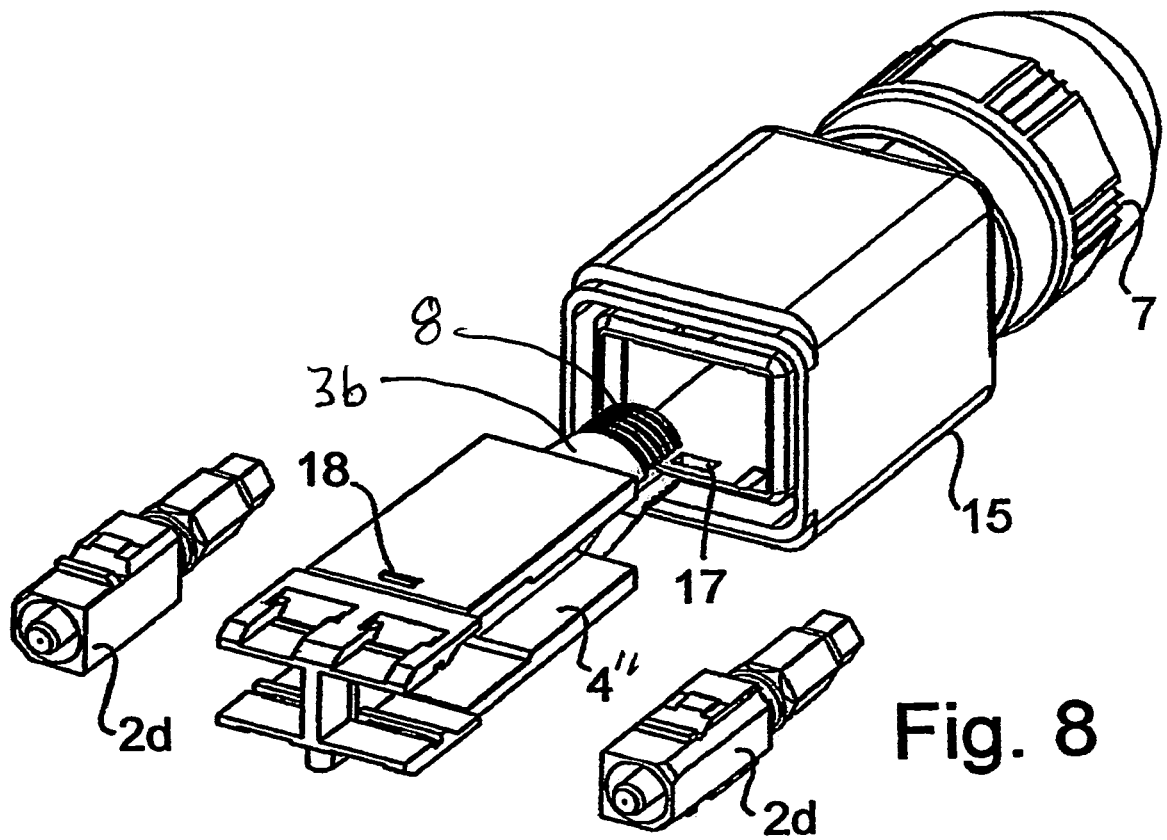

Referring to FIGS. 3 and 4, it will be seen when a second type of electrical plug 2b is provided, use of an auxiliary plug support member (similar to the member 4 of FIG. 2) is not required, since the plug may be inserted directly into the chamber 30 contained in the rectangular end of the adapter body 3. In the embodiment of FIGS. 5 and 6, an auxiliary frame 4' is provided for supporting a pair of plugs 2c (such as LC duplex plugs) within the rectangular chamber 30 contained in the end portion 3a of the adapter body 3. In the embodiment of FIGS. 7 and 8, a pair of electrical plugs 2d are mounted by the auxiliary plug support 4" within the chamber 30 contained within the end portion 3a of the adapter body 3. In accordance with one feature of the invention, the longitudinal position of the auxiliary plug support member 4' (FIG. 6) may be fixed relative to the chamber 30 contained within the adapter body 3 by screw means S that extend through a corresponding opening 17' contained in the auxiliary support member. In FIGS. 7 and 8, the plugs 2d are of the SC-RJ: 7.35 mm type.

Figure 9:
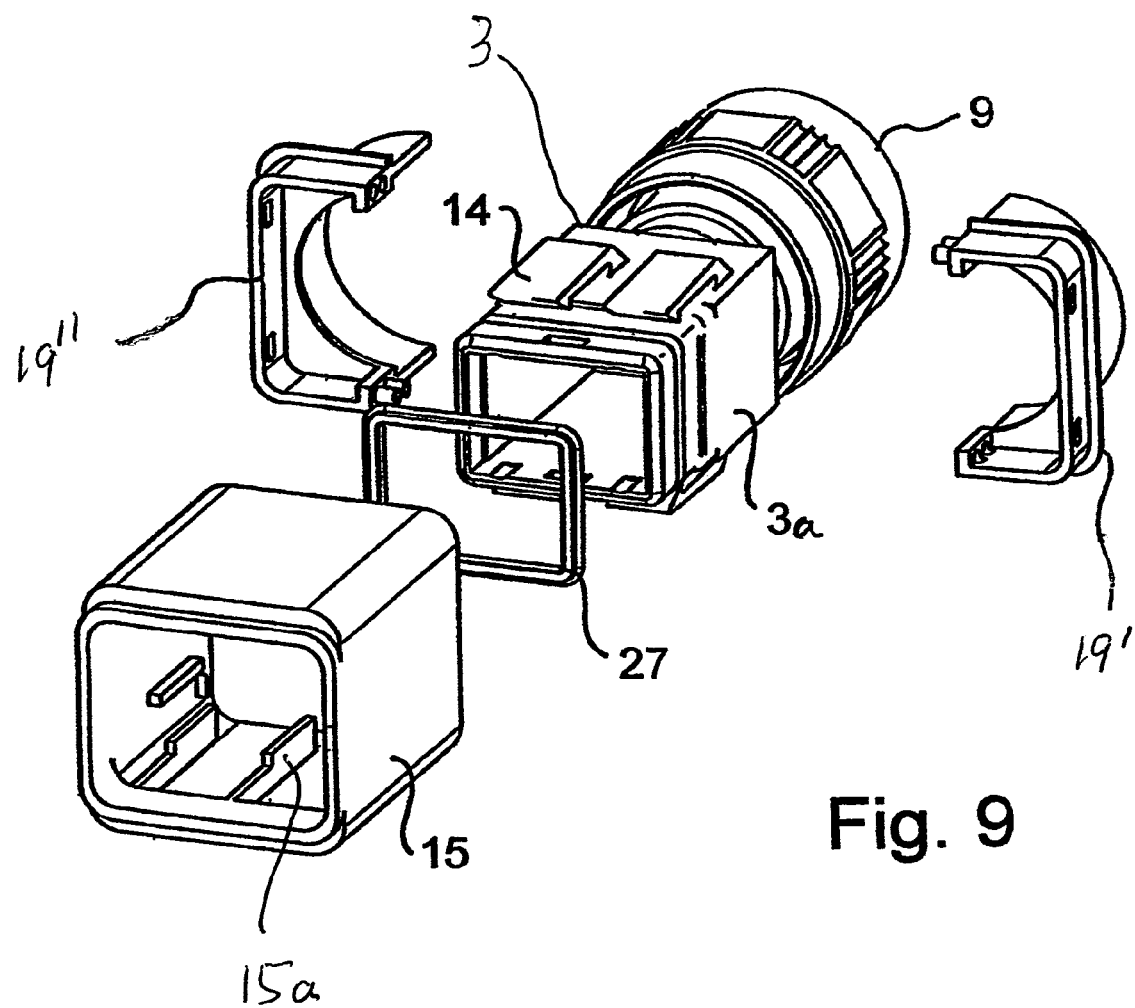
FIGS. 9 and 10 are front and rear partially exploded perspective views of the adapter assembly of the present invention
Figure 10:
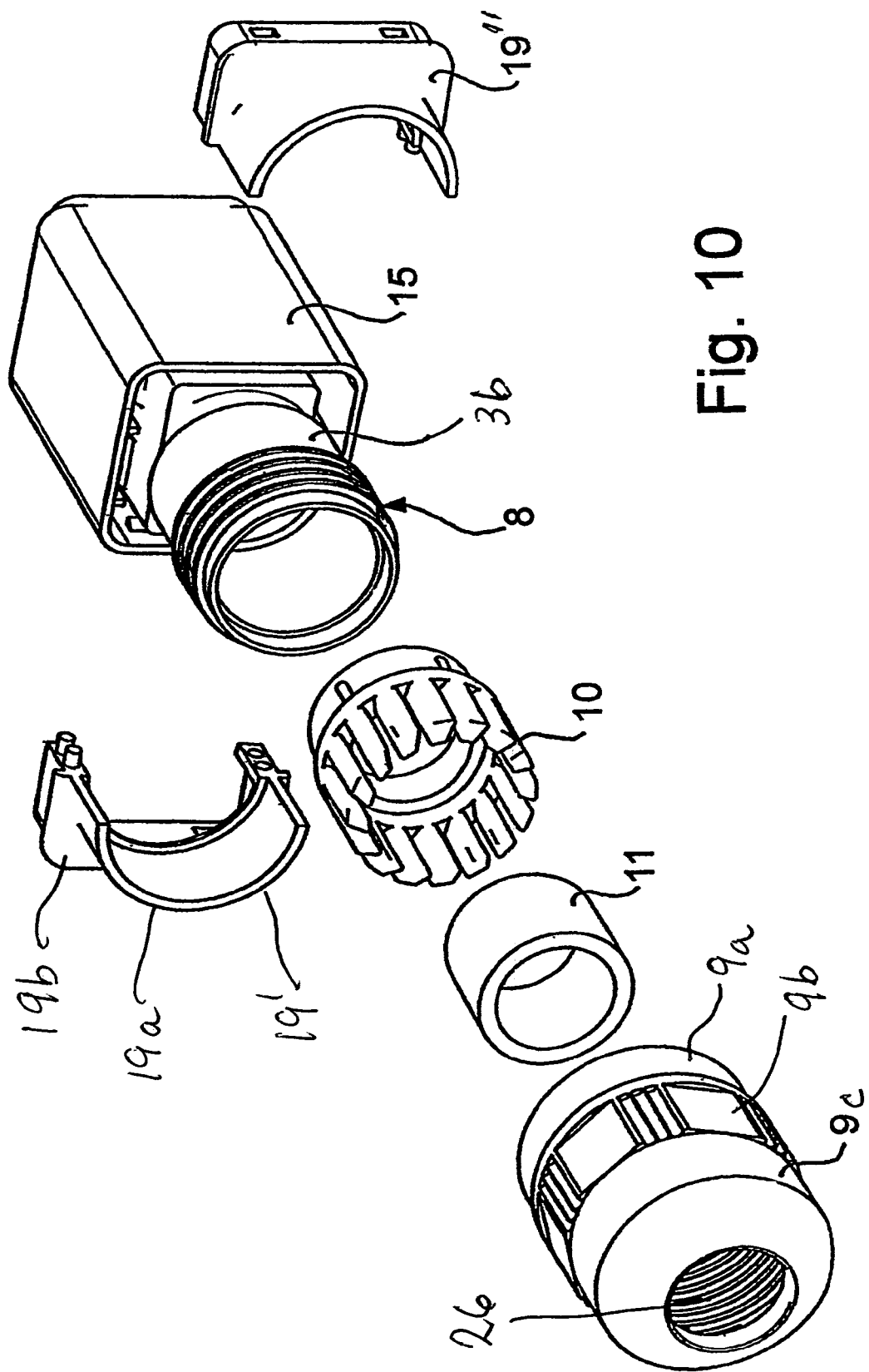

FIG. 9 illustrates the manner in which the sections 19' and 19" of the adapter sleeve 19 are mounted together on the outer surface of the rectangular portion 3a of the adapter body 3, and the manner in which the rectangular seal 27 is arranged between the adapter body 3 and the outer sleeve member 15. Also illustrated are the support ribs 15a that guide and support the plug means relative to the adapter body 3a and serve as a stop means. FIG. 10 illustrates the manner in which the annular seal 11 is supported by the resilient fingers of the chuck member 10.

Figure 14:
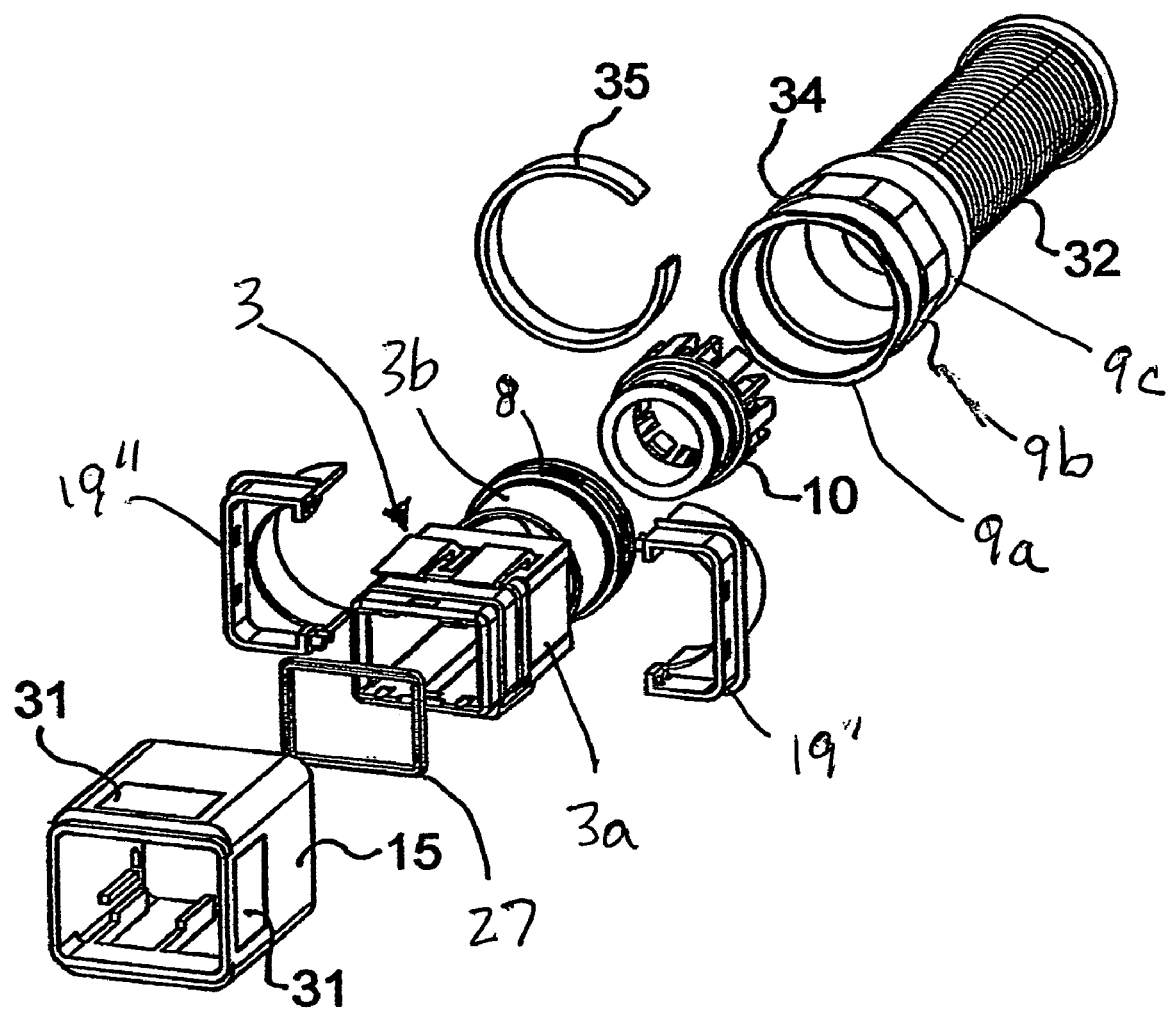
FIGS. 14 and 15a-15c are exploded views illustrating the apparatus of the present invention provided with color coded means.
Figure 15A:
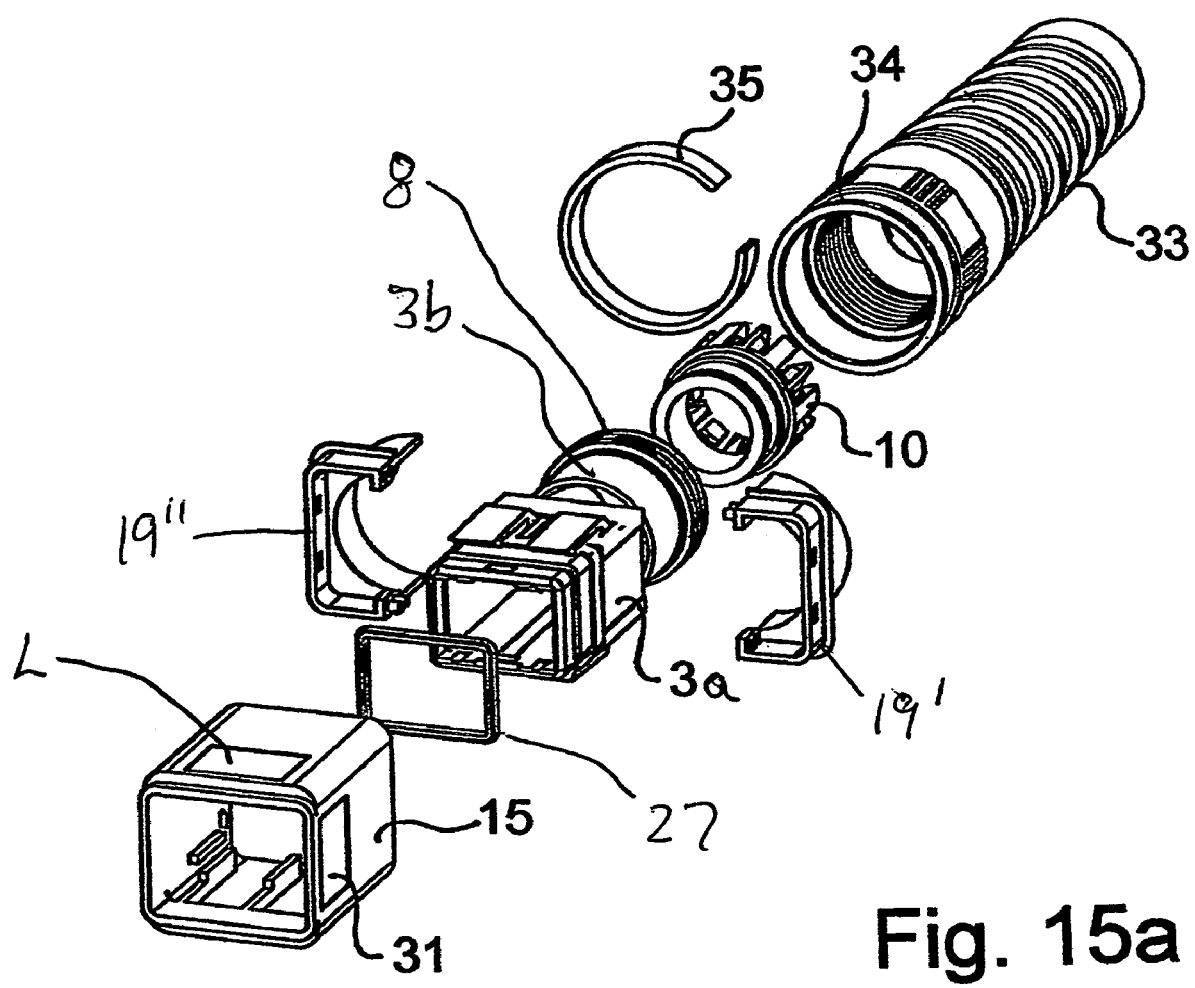
Figure 15B:
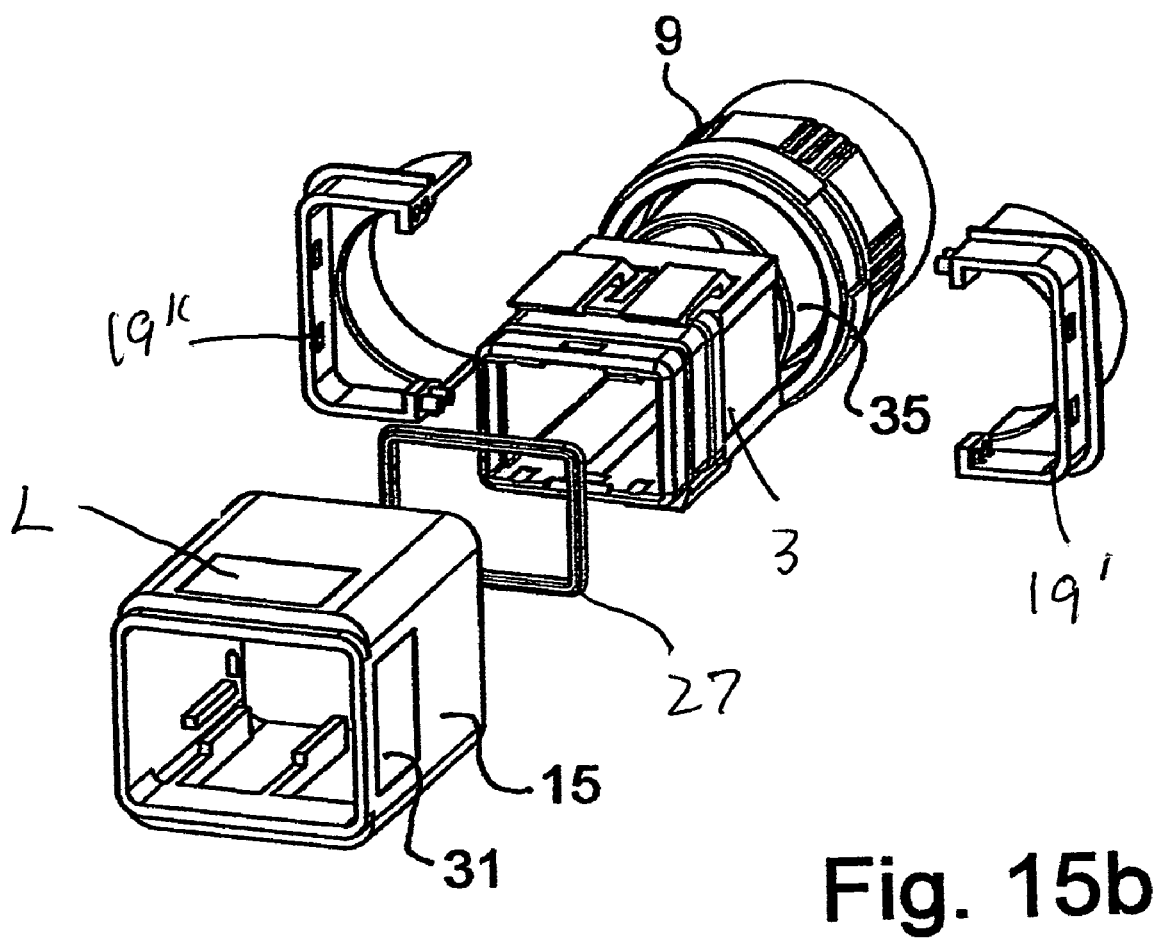
Figure 15C:
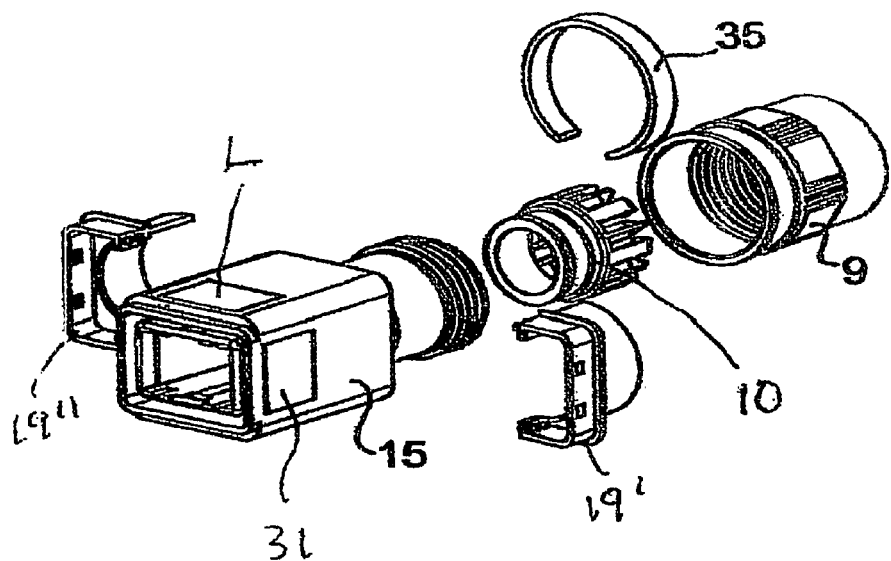
Figure 15D:
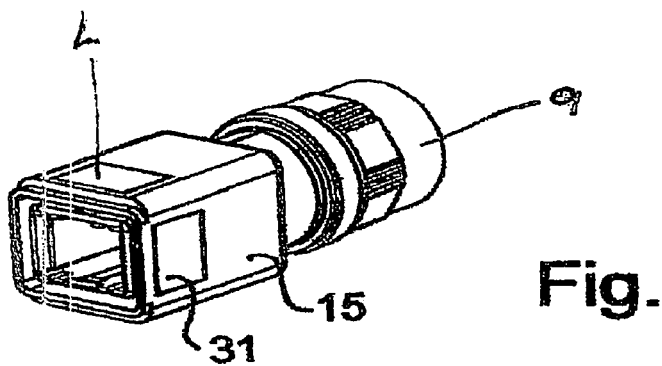
FIG. 15d is a perspective view illustrating the apparatus of FIG. 15 c in an assembled condition.

Referring now to FIG. 14, it will be seen that the cable sleeve 9 may be provided at its end portion 9b with a protective sleeve 32 that protects the cable C against bending. A protective sleeve 32 may be formed of metal for example or, as illustrated by the protective sleeve 33 in FIG. 15a, from a synthetic plastic material. It will be seen that in FIGS. 14 and 15a, a color-coded split resilient sleeve member 35 is provided that is snapped around the first end portion 9a of the cable sleeve 9, which split annular member extends within a corresponding circular groove 34 contained in the outer peripheral surface of the cable sleeve 9. The split rings 35 may be color-coded to peripheral identification of the adapter assemblies corresponding to the types of electrical plugs that are to be incorporated in the devise. Similarly, in FIGS. 15b and 15c, the color-coded bands 35 are mounted on the external cylindrical surface of the cable sleeve 9. in this embodiment, the outer sleeve member 15 is provided with recesses 31 that receive color-coded or indicia-bearing labels L, thereby to further identify the specific adapter assemblies.

Figure 15E:
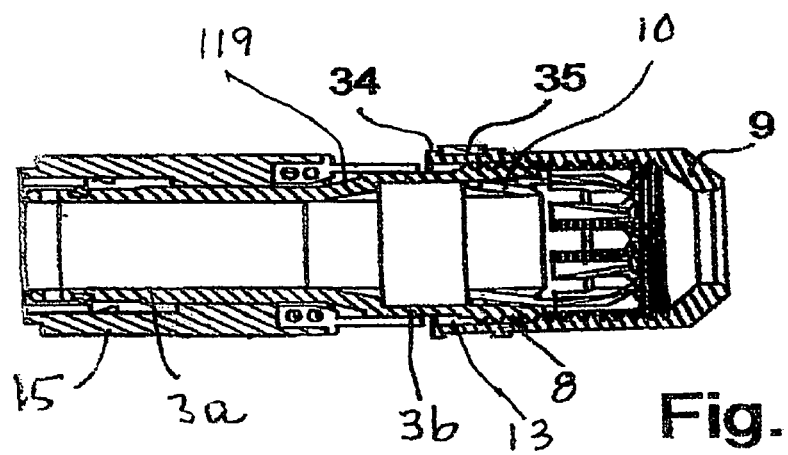
FIG. 15e is a longitudinal sectional view of a second embodiment of the invention.
Figure 16:
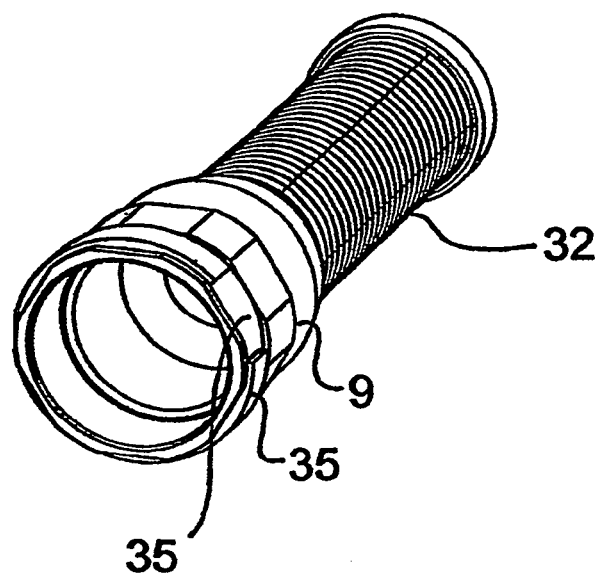
FIGS. 16-18 are perspective views illustrating the manner in which the color coded bands are mounted on the cable sleeve components.
Figure 17:
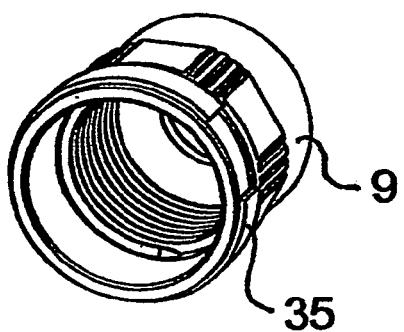
Figure 18:
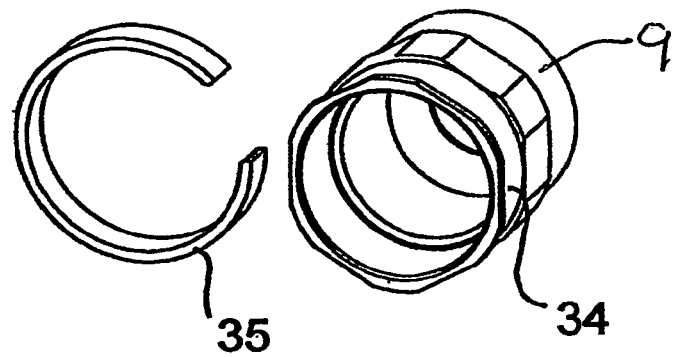
Figure 19A:
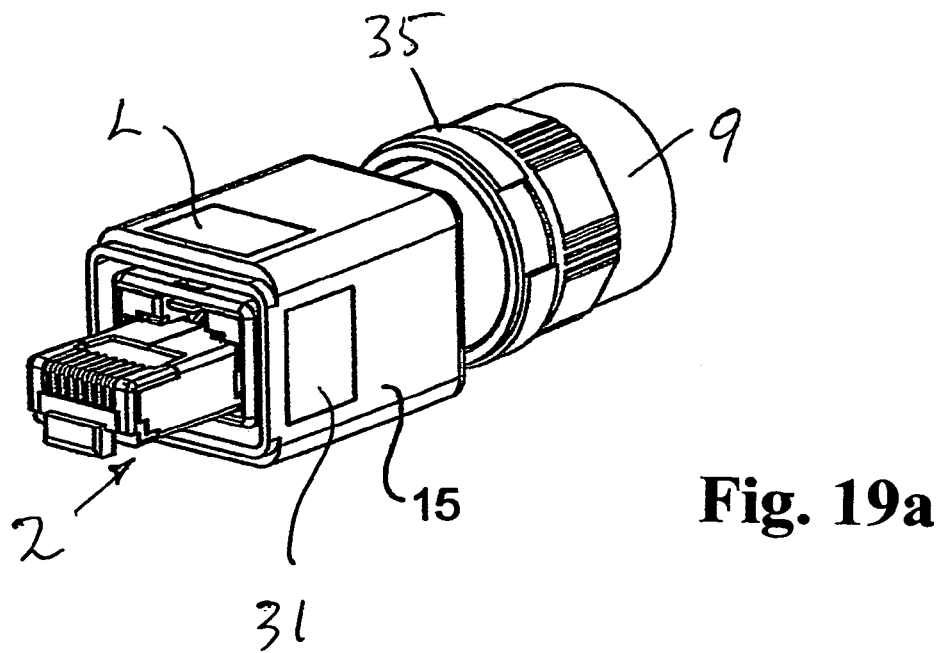
FIGS. 19a and 19b are perspective and exploded views, respectively, illustrating the mounting of color-coded or indicia-bearing labels to the outer sleeve member of the adapter assembly including an auxiliary plug support.
Figure 19B:
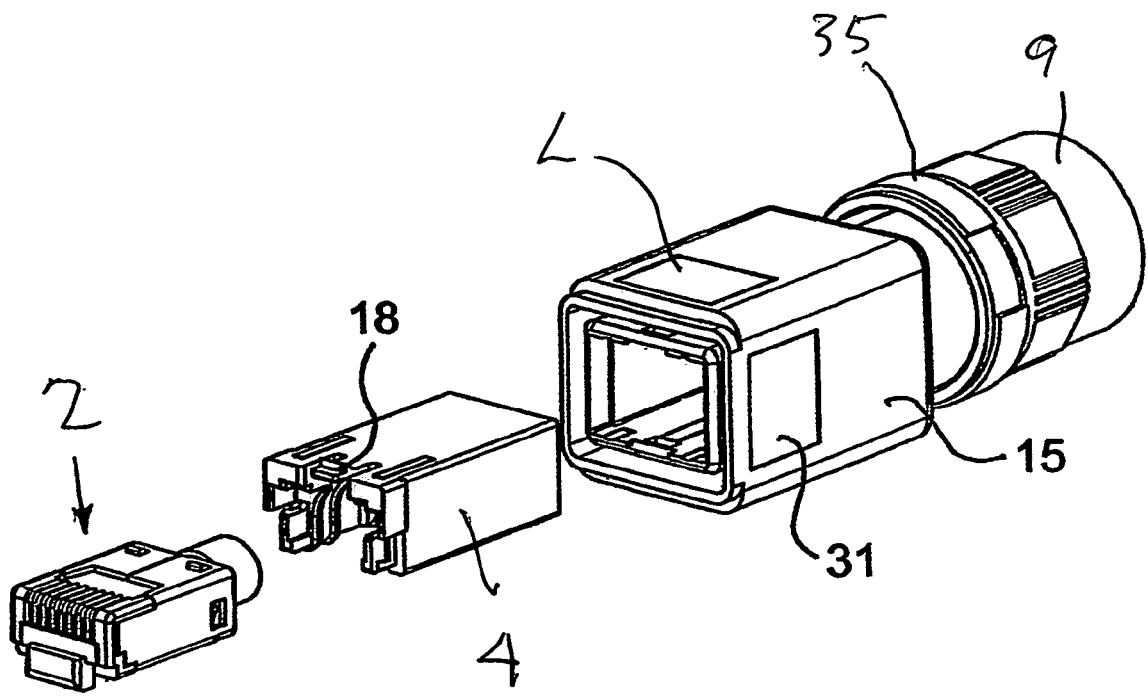
Figure 20A:
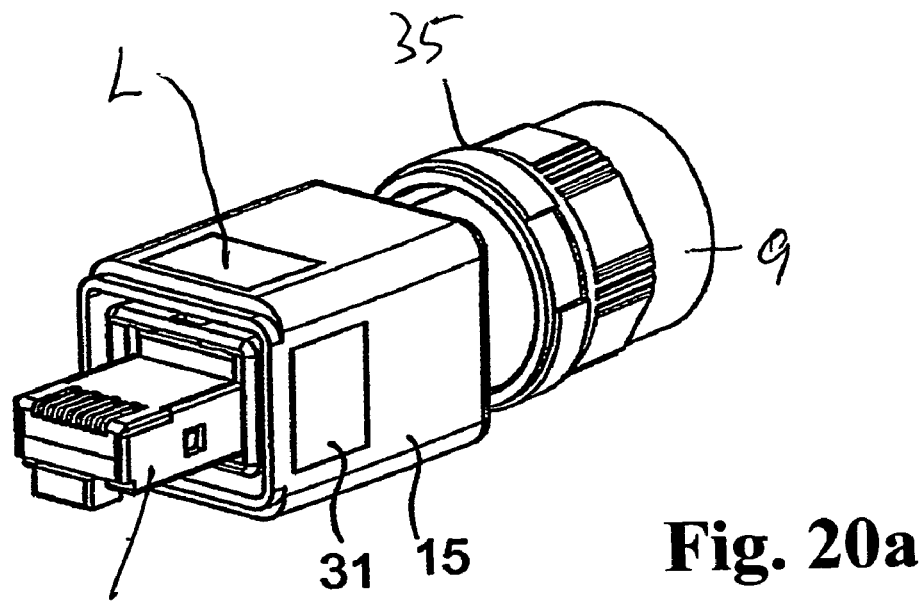
FIGS. 20a and 20b, FIGS. 21a and 21b, and FIGS. 22a and 22b are corresponding perspective and exploded views, respectively, illustrating the adapter assembly of FIGS. 19a and 19b when used with various other electrical plug arrangements.
Figure 20B:
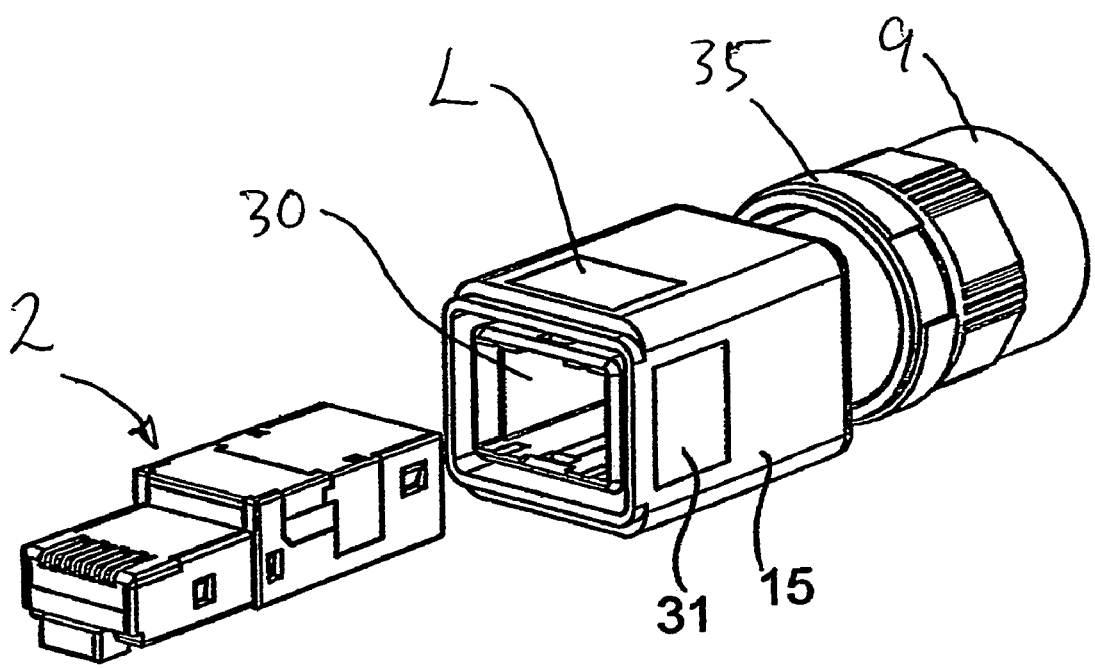
Figure 21A:
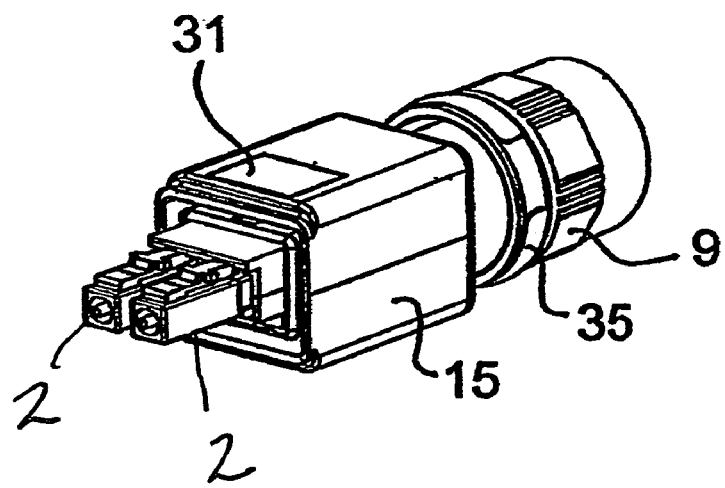
Figure 21B:
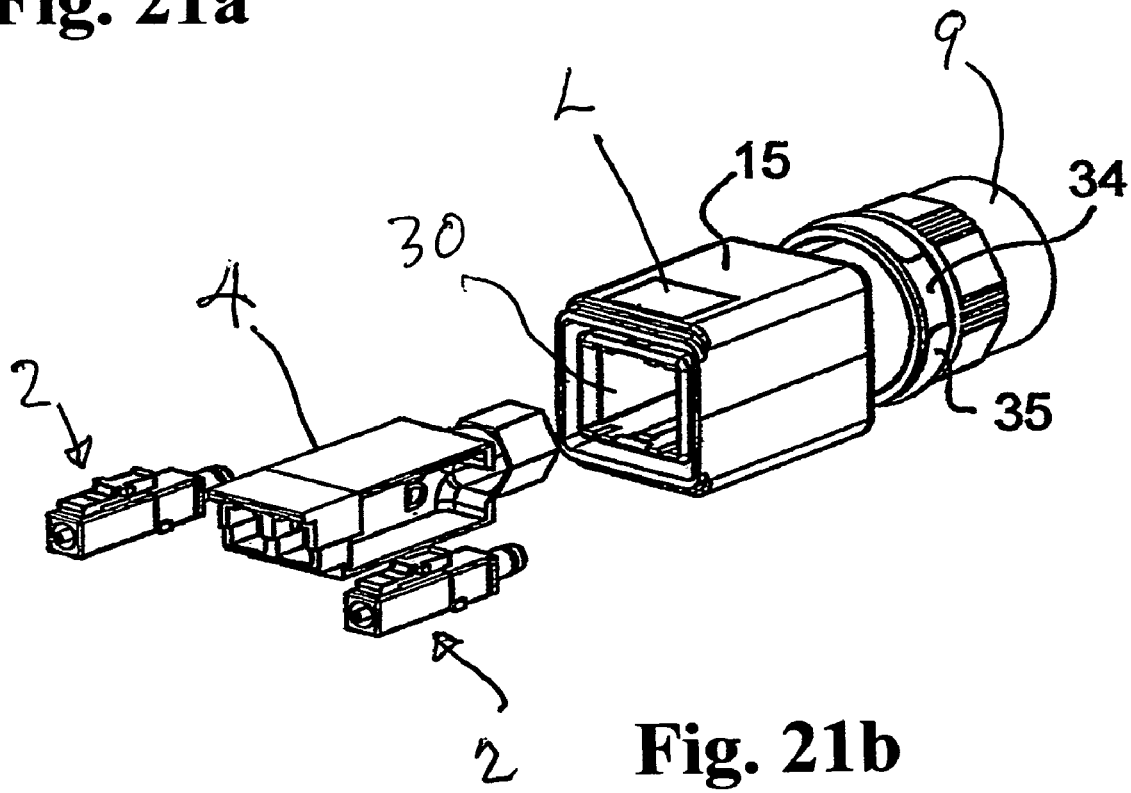
Figure 22A:
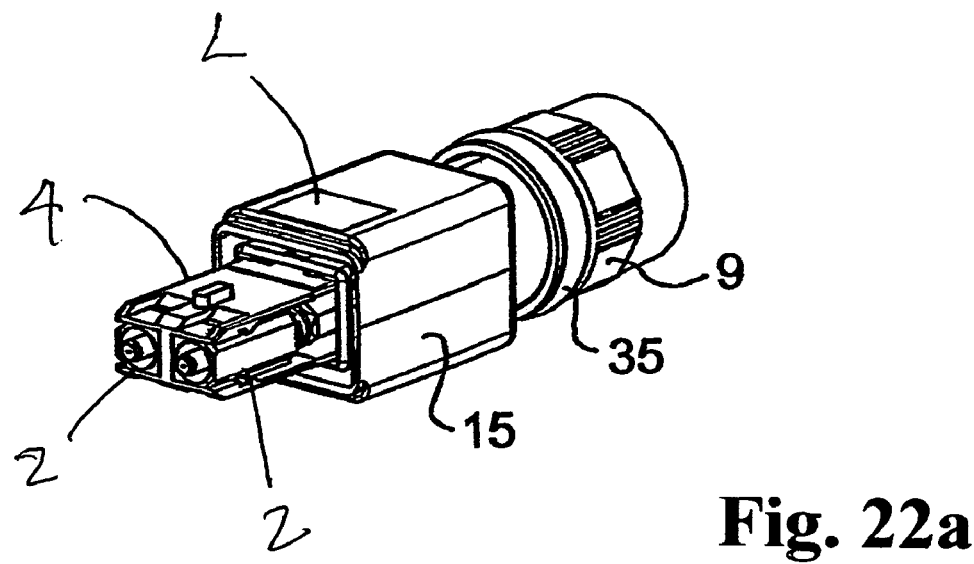
Figure 22B:
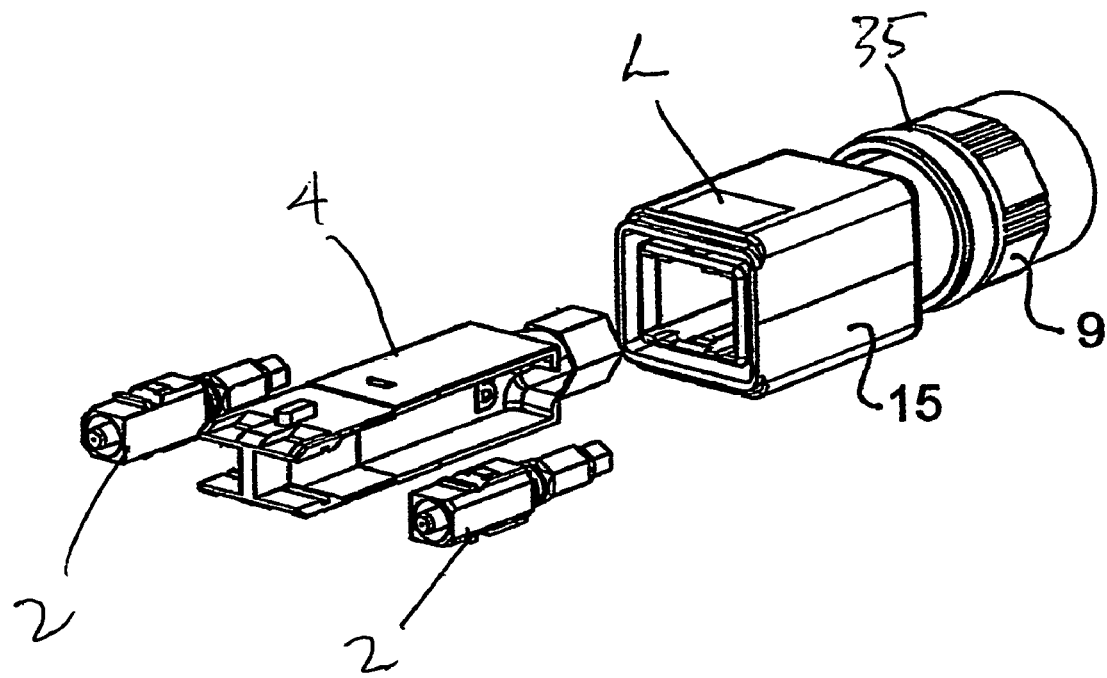

In accordance with another modification of the invention illustrated in FIG. 15e, the seal means extending within the annular space 13 may be a tubular portion 119 that is either secured directly to the adjacent end of the outer sleeve member 15, or is integral with the outer sleeve member 15. Thus, in the embodiment of FIG. 15e, one end of the annular space 13 is closed by the screw thread engagement of the screw threads 8 and 26, and the other end of the annular space 13 is closed by the seal means 119. FIGS. 16-18 illustrate the manner in which the color-coded bands 35 are mounted on the cable sleeve 9. FIGS. 19a, 19b, 20a, 20b, 21a, 21b, 22a, and 22b illustrate various plug arrangements for use with adapter assemblies that are identified by color band means 35 or color-coded or indicia-bearing label means L.

The adapter body 3 has end walls which are made thinner, segment by segment, in the introduction area or in the area of the front opening in FIGS. 1 to 8 in order also to be able to insert wider plug parts into the chamber 30. The side walls, thus set back, lead to a widened opening in the front area and facilitate the reception of wider plug parts and their assembly/supply. This also decisively contributes to the ability to house relatively large plug parts in the adapter.

The adapter sleeve 19 is connected in a locking manner directly, for example, with the sliding sleeve 15, which, at one of its ends, has a tubular portion 19a that engages the annular space 13 inside the projection of cable sleeve 9. At the other end, it engages the band portion 19 upon locking means 28 into the axial end of the sliding sleeve, whereby one might also conceive that sealing rings and/or additional locking means will secure adapter sleeve 19 on the sliding sleeve 15 and/or cable sleeve 9 (in the annular space 13).

Adapter sleeve 19 can consist of two easily assembled half-shells 19' and 19" that are connected with each other, for example, via a press seat upon pins 24 and corresponding blind holes 25. As an alternative, one can also make an integral design (not shown, for example, consisting of rubber or an elastomer), provided it can be assembled or can be taken out of the mold.

In this way, one can in a simple fashion achieve a good protective effect, especially against the penetration of dirt and/or moisture, in particular, in the area of annular space 13 in which engages adapter sleeve 19 (or a sleeve segment on the sliding sleeve), which effect can be further increased by means of sealing rings or other measures to attain particularly high protection classes.

Optionally, one could also conceive designing adapter sleeve 19 and sliding sleeve 15 together in one piece (not shown). Adapter sleeve 19, which advantageously and in an easily assembled manner consists preferably of the two half-shells 19' and 19", can possibly be made as a two-component injection-molded part with sealing ring areas along its interior and exterior surfaces.

The plug components 2 are locked directly in the chamber 30 of the adapter body 3. Therefore, the locking arrangement will offer high stability. The protruding eyelet, plus the pertinent tongue of the state of the art, which can be easily damaged, is thus avoided. Locking means 17, 18 furthermore are advantageously arranged outside the sealing ring 27 between the receiving frame 3 and the sliding sleeve 15 in such a manner that unlocking or unlatching is or remains possible from outside the assembly.

In order to receive various plug components 2 in a sealed manner, it is necessary to provide either the plug components 2 or the auxiliary frames 4 for the plug parts 2 with the necessary locking contours or locking means 18 for locking upon locking means 17. As locking contours or means 18, one might conceive of projections, locking hooks, a hole, recesses, etc. that are made on plug part 2 and that are correspondingly again found on the adapter body 3.

In this manner, one can in a simple manner, with the help of the adapter assembly 1, implement the reception of an RJ45 plug (reference symbol 2a, FIGS. 1, 2) from the office setting with the help of the adapter. The following plugs can preferably be accepted: RJ45 8xAWG 27/7-24/7 (Piercing contacts), RJ45 8xAWG 26/7-22/7 (IDC contacts), LC duplex (FIGS. 5 and 6), 2×SC simplex units (at the interval of an SC-RJ; 7.35 mm; FIGS. 7 and 8), power contacts, USB, firewire, coax and/or sensor/actuator contacts. The invention-based arrangement is particularly suitable for use in the sensor/actuator or field bus technique area.

Sliding outer sleeve member 15 as well as adapter sleeve 19 and/or cable sleeve 9 and/or an optional bending protection can be implemented just like the plug parts 2 with plastic or metal parts or also as composite parts made up of several materials. In the metal version, all external housing parts preferably consist of metal (against welding beads and high mechanical stress). The indivisible, internal plug reception or the receiving housing 3 can also be made of metal in order to meet stiff mechanical requirements. Depending on requirement and use, individual parts of the adapter can also consist of plastic or metal. On the receiving housing 3 made of metal, the locking hooks 14 preferably also consist of metal, for example, of spring steel to enhance the mechanical stability. Mixed forms (receiving housing 3 made of plastic or metal and the adapter sleeve made of metal or plastic) are conceivable.

The locking hooks 14 can be actuated instead via a ram, also via a rocker, to reduce production costs (as low-cost version without sliding sleeve 15 and adapter sleeve 19).

Associated with the adapter can also be an arresting element for locking the position of the sliding sleeve after insertion of the adapter into the socket. The arresting element can be made as a flexible ring segment consisting of plastic or spring steel and, after the production of the plug connection (adapter 1 with plug part 2 in socket), it can be snapped on between sliding sleeve 15 and cable sleeve 9. An encoding color selection can then be implemented also by means of or on the arresting element (all of which is not shown here).

It is, however, advantageous when cable sleeve 9 consists of metal and/or when the cable sleeve 9 is arranged or fashioned in one piece in a traction relief, especially in the form of a strap.

Preferably, the optical plane of the plug part according to an advantageous version of the invention, which can also be considered as an independent invention, is so made on adapter 1 that one can make a connection—free of any coupling piece—of the light-conducting media (glass, HCS, POF) to a transceiver housing (not shown here). To achieve this, one would have to adjust different thicknesses of cabinet/housing walls and differing positions/locations of the transceiver housing. This can be done in a functional manner in that the optical plane is positioned during the cable/plug production or in that the locking point of auxiliary frame 4 is additionally so designed that it can be set in adapter 1.

As an alternative to the standard locking in the lowest position, the auxiliary frame 4 can also be positioned and fixed further forward with a sealed screw S (FIG. 6) between the locking hook attachment 14 in receiving housing 3 in almost any desired location; only then are the sliding outer sleeve 15 and the adapter sleeve 19 assembled. For this purpose, there is a corresponding hole for the fastening screw. The sealing can be implemented by a flat seal under the partly lowered screw head.

Preferably, receiving housing 3 is made with a fastening hole for auxiliary frame 4, optionally for the purpose of making it without a fastening hole (something that can be done on the same conversion WZ) with otherwise identical design and dimensions of adapter 1 in compliance with the IEC 61067-3-106 Variant 4. In that way, we get a connection—free of any coupling pieces—of the light-conducting media by way of the free positioning of the optical plane in the adapter by means of the fastening screw.

According to FIGS. 14 and 15 and some other figures, surfaces 31 (depressions) are made on sliding sleeve 15, which are suitable for receiving markers L or the like (also adhesive tags). FIGS. 14 and 15 as well as some other figures furthermore disclose on cable sleeve 9 the already previously mentioned bending protection nozzle 32, 33 for a cable on plug part 2 that according to FIG. 14 consists of metal and according to FIG. 15 consists of plastic.

Along its outer circumference, cable sleeve 9 furthermore contains a groove 34 to receive a preferably slit ring 35 that can be used, for example, as a color marking. FIGS. 14 and 15 also show an alternative design of the spring chuck 10 (in this case, without sealing ring 11).

While in accordance with the provisions of the Patent Statutes the preferred forms and embodiments of the invention have been illustrated and described, it will be apparent to those skilled in the art that changes may be made without deviating from the invention described above.

What is claimed is:

1. An adapter assembly for attaching an electrical plug (2) to a cable fitting arrangement, comprising:
   (a) an elongated adapter body (3) containing a longitudinal cable-receiving through passage, said adapter body including:
      (1) a rectangular first end portion (3a) having a generally rectangular cross-sectional configuration defining a chamber (30) for receiving a plug connected with the cable; and
      (2) a tubular second end portion (3b) having inner and outer cylindrical surfaces, a portion of said outer cylindrical surface adjacent the free extremity thereof being externally threaded to define first screw threads (26);
   (b) a tubular cable sleeve (9) including first end, intermediate and second end portions (9a, 9b, 9c),
      (1) said first end portion extending in concentrically spaced relation about said housing outer cylindrical surface, thereby to define an annular space (13);
      (2) said intermediate portion (9b) being internally threaded to define second screw threads (26) threadably connected with said first screw threads, thereby to close one end of said annular space;
      (3) said second end portion (9c) extending axially beyond said free extremity of said adapter body second end portion; and
   (c) annular seal means sealing the other end of said annular space, said annular seal means comprising an adapter sleeve (19, 119) arranged concentrically about said adapter body cylindrical outer surface, said adapter sleeve including:
      (1) a tubular first end portion (19a) into said annular space other end: and
      (2) a rectangular second end portion (19b) having a rectangular cross-sectional configuration defining a rectangular chamber, said adapter body rectangular first end portion extending into said rectangular chamber.

2. An adapter assembly as defined in claim 1, and further including means for locking an electrical plug to said adapter body.

3. An adapter assembly as defined in claim 1, wherein said cable sleeve includes flexible tubular bend protection means (32) extending axially from said cable sleeve second end portion.

4. An adapter assembly as defined in claim 1, and further including color coded identification means associated with at least one of said adapter body, cable sleeve, annular seal, and cable sleeve members.

5. An adapter assembly as defined in claim 1, wherein said adapter sleeve is longitudinally diametrically bifurcated to define a pair of adapter sleeve sections (19', 19").

6. An adapter assembly as defined in claim 5, and further including first fastener means (24, 25) for fastening together said adapter sleeve sections.

7. An adapter assembly as defined in claim 1, and further including:
(d) an annular sealing ring (11); and
(e) support means (10) supporting said sealing ring concentrically within said cable sleeve second end, the internal diameter of said sealing ring being such as to receive and support one end of the cable within said cable sleeve second end.

8. An adapter assembly as defined in claim 7, wherein said support means comprises an annular chuck member (10) includes an annular chuck body having a plurality of axially-extending resilient fingers extending circumferentially about said annular sealing ring.

9. An adapter assembly as defined in claim 1, wherein the end extremity of said adapter body rectangular first end portion has stepped outer surfaces of successively reduced thickness.

10. An adapter assembly as defined in claim 1, and further including:
(d) a hollow rectangular outer sleeve member (15) containing a through passage (29) having a rectangular cross-sectional configuration, said adapter body rectangular first end portion and said adapter sleeve rectangular second end portion extending into said outer sleeve member through passage.

11. An adapter assembly as defined in claim 10, and further including a rectangular hollow sealing member (27) mounted in compressed relation concentrically between said adapter body first end portion and said outer sleeve member.

12. An adapter assembly as defined in claim 10 wherein at least one of said adapter body, said cable sleeve, said adapter sleeve, and said outer sleeve is formed from an electrically insulating synthetic plastic material.

13. An adapter assembly as defined in claim 10, wherein at least one of said adapter body, said cable sleeve, said adapter sleeve, and said outer sleeve is formed from metal.

14. An adapter assembly as defined in claim 10, wherein said annular seal means comprises an annular portion (119) of sealing material connected with one end of, and extending axially from, said outer sleeve member, said annular portion extending concentrically about, and in sealing engagement with, the outer cylindrical surface of said adapter body second end portion.

15. An adapter assembly as defined in claim 14, wherein said annular portion of sealing material is integral with said outer sleeve member.

16. An adapter assembly as defined in claim 10, and further including first locking means (14, 16) for locking said adapter body first end portion to said outer sleeve member.

17. A adapter assembly as defined in claim 16, wherein said first locking means comprise one-way snap fastener locking means operable to a locking condition when said outer sleeve member is slidably displaced on said adapter body first end portion in the direction of said adapter body second end portion.

18. An adapter assembly as defined in claim 16, and further including second locking means (28a, 28b) for locking said adapter sleeve second end portion to said outer sleeve member.

19. An adapter assembly as defined in claim 10, and further including;
(e) a rectangular auxiliary plug support member (4) inserted into said adapter body rectangular one end, said auxiliary plug support member containing at least one through passage for supporting an electrical plug.

20. An adapter assembly as defined in claim 19, and further including:
(f) screw means (S) for fastening said auxiliary plug support member at a desired longitudinal position relative to said adapter body.

21. An adapter assembly as defined in claim 19, and further including:
(f) locking means for locking the electrical plug to said auxiliary plug support.

22. An adapter assembly as defined in claim 19, and further including:
(e) releaseable locking means (18) for releasably connecting said auxiliary plug support member with said adapter body.

23. An adapter assembly as defined in claim 22, and further including:
(f) a rectangular hollow sealing member (27) mounted in compressed relation concentrically between said adapter body first end portion and said outer sleeve member, said sealing member being arranged between said releaseable locking means and said adapter body second end portion.

* * * * *